UNITED STATES PATENT OFFICE.

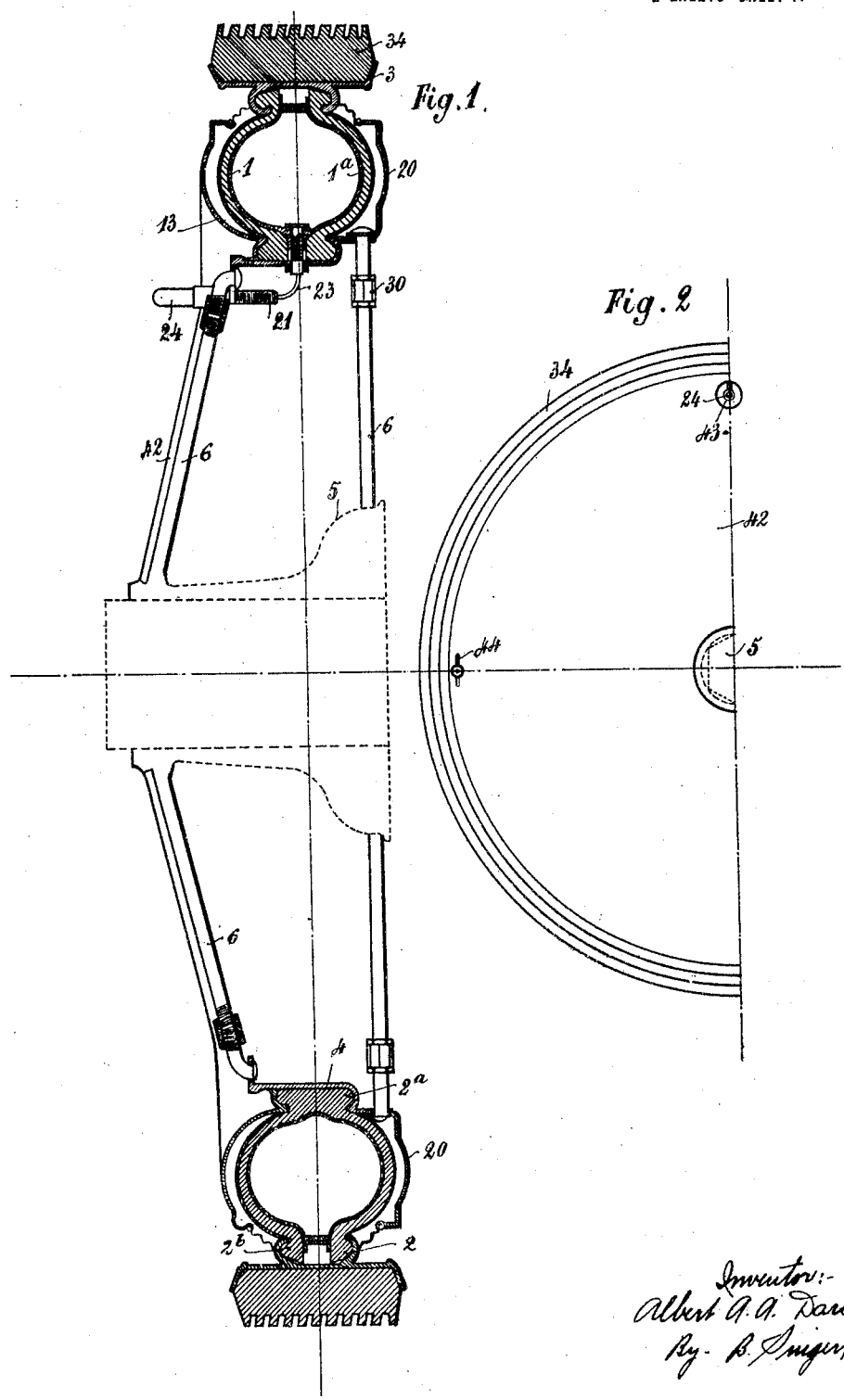

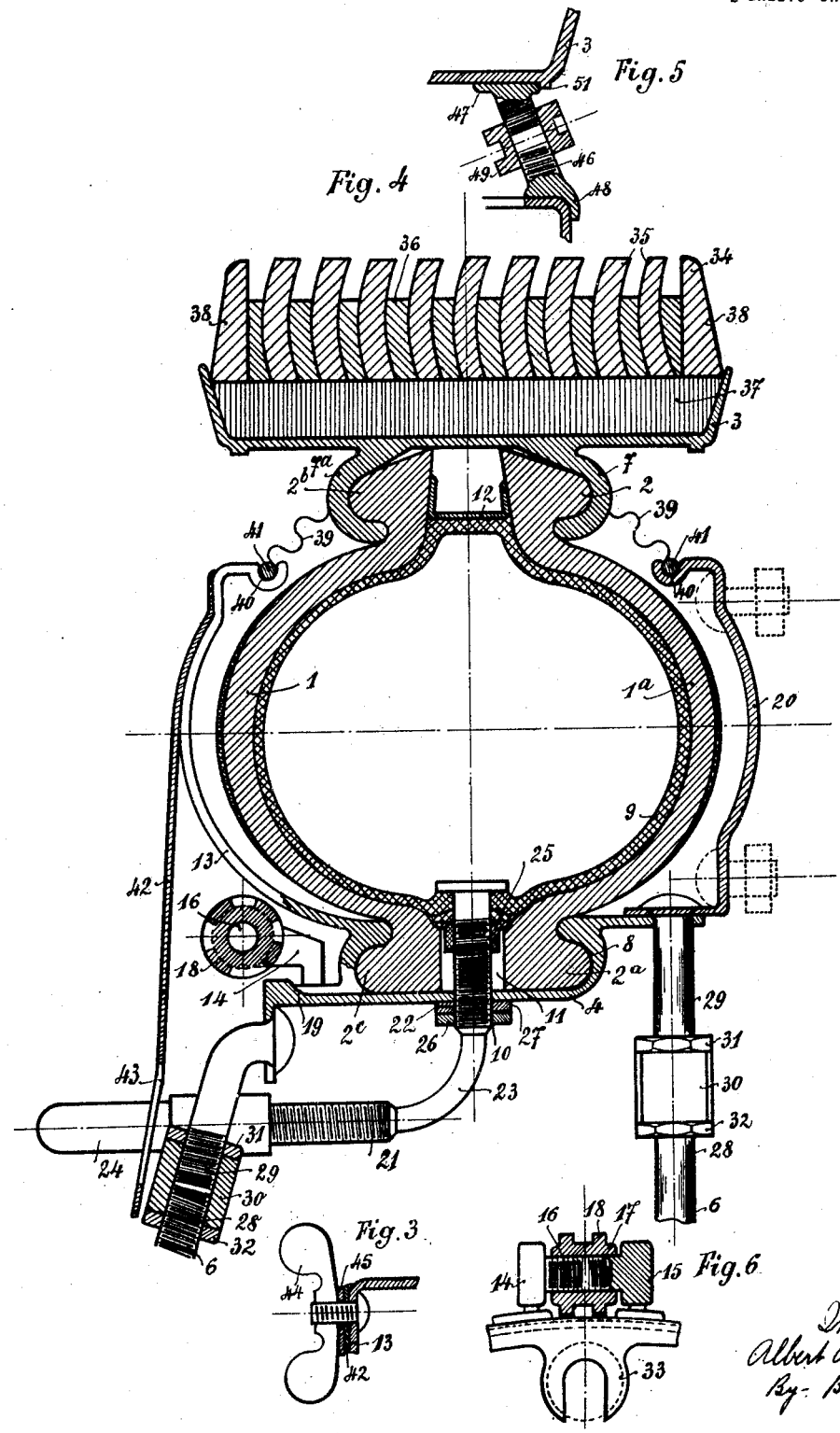

ALBERT ALEXANDRE AUGUSTIN DARCHE, OF ALGER, FRANCE.

RESILIENT WHEEL.

1,413,159.  Specification of Letters Patent.  Patented Apr. 18, 1922.

Application filed September 4, 1919. Serial No. 321,638.

*To all whom it may concern:*

Be it known that I, ALBERT ALEXANDRE AUGUSTIN DARCHE, a citizen of the Republic of France, residing at Alger, France, have invented Improvements in Resilient Wheels, of which the following is a specification.

The invention relates to resilient wheels its object being to provide powerful internal pneumatic shock absorbing means.

The pneumatic cover owing to its liability to puncture and burst gives much annoyance and is costly for the mileage obtained.

Detachable rims, detachable wheels and so on have been proposed with a view of overcoming the drawbacks; it has even been tried to replace it by spring or elastic wheels but none of these have been successful being incapable of absorbing the accelerations produced in all directions. These accelerations are a big consideration at higher speeds and would keep the vehicle in constant state of vibration thereby provoking the molecular crystallization and the disaggregation of all the parts of the vehicle.

Therefore, there is no system which gives the power and flexibility, the regularity of compression and release, facility of graduation, resistance to wear and the reduced weight of a gas compressed in a circular chamber of supple and resisting material.

It is necessary to avoid vibrations between the rim and the road and the pneumatic tire appears to have to be in the dangerous neighborhood of the latter. It is my opinion that this is a wrong application for it would not appear essential that the accelerations produced should be absorbed by the rim itself, the main thing being that they should be absorbed before affecting the hub.

In placing an ordinary pneumatic tire of reduced diameter between the rim and the hub of a wheel in order to have both carried along together, important difficulties must be overcome which require a complicated arrangement of the various parts.

An absorber designed on rational lines between the rim and the hub of the wheel should therefore meet the three following requirements:

(*a*) Give a simultaneous rotation of the wheel hub and rim at the same angular speed particularly at the starting up and braking.

(*b*) Absorb the transversal accelerations at the same time correctly resisting the action of the centrifugal force in curves.

(*c*) Absorb vertical accelerations.

The last two results can only be obtained with a powerful shock absorber owing to the inevitable increase in the weight displaced. To reduce the latter, the shock absorber should be as near as possible to the rim while nevertheless being protected from any damage.

A resilient wheel produced on these lines should not be of excessive weight and would need no special upkeep.

The arrangement according to the present invention gives a resilient coupling of the rim with an independent hub, connecting them by two rubber and canvas or like crowns which are terminated at each edge by a fixing bead and which are symmetrical in relation to a median plane.

The crown members render the wheel rim, in the direction of rotation, in one with an auxiliary concentric rim fitted to the hub by means of spokes. The external and auxiliary rims are provided with attachment in which engage and are held the beads on the crown members, this assemblage giving to the rim, in respect to the hub, independent displacement, in the vertical, transverse, longitudinal or angular directions.

Between the two crown members is disposed an air inflated inner tube. The whole, after inflation, constitutes an internal shock absorber.

All transversal, vertical, oblique or longitudinal displacement of the rim produces on the crown members not only a partial deformation but a complete deformation. Consequently, the reduction in the volume of air and the consecutive increase of the internal pressure, take an appreciable value for a slight displacement of the rim.

The reaction of the shock absorber is equally distributed instead of being merely local as in the pneumatic tire.

In the drawings:

Fig. 1 is a transverse vertical section of a wheel constructed according to this invention.

Fig. 2 is a side elevation of a portion of the wheel.

Figs. 3, 5 and 6 are detail views of various parts.

Fig. 4 is a section to a larger scale of the pneumatic shock absorbing means.

The pneumatic shock absorber A comprises two crown members of rubber and canvas or like material 1, $1^a$ having beads 2, $2^a$, $2^b$, $2^c$. The crown members connect the rim 3 and the auxiliary rim 4 which latter is secured to the hub 5 by spokes 6. The rim 3 is furnished with hook edges 7, 7ª in which fit the beads 2, 2ᵇ of the rubber crowns, the rim 4 being also provided with members 8.

Between the crowns 1, 1ª is arranged an inner tube 9 which can be inflated through a valve 10 of such a shape as to fit in the spaces or recesses 11 provided in the beads 2ª, 2ᶜ of the crowns 1, 1ª. In order to press the beads 2, 2ᵇ in their housings, a circular piece 12 is interposed between them and on which presses the inner tube 9 when inflated.

This piece also has the advantage of diminishing the total volume of air of the absorber. The heel 2ª is held upon the auxiliary rim 4 by the hook 8. The bead 2ª is held by a cheek 13 protecting the crown 1ª and giving along its entire radial width, an opening the width of which can be varied by means of two members 14, 15; these parts carry screw threaded nipples 16, 17 one at the right and one at the left side; on these nipples 16, 17 is disposed a union with right and left hand threads which can cause the members 14, 15 to approach each other or move further apart and hence diminish or increase the radial distance of the cheek. This cheek is engaged without difficulty upon the rim 4 the diameter of which is slightly smaller, the cheek tending to tighten it strongly the more the parts 14, 15 are drawn together. Constrained on the other hand to slide on the ridge 19 of the rim 4, the cheek 13 at the same time holds the free bead 2ᶜ of the crown 1ª, against the bead 2ª of the other crown.

On the opposite face is arranged a cheek 20 protecting the other crown 1 and riveted to the rim 4.

The section of the crowns 1, 1ª forms beads 2, 2ᵇ like the beads 2ª, 2ᶜ, the peripheral portion being more active than the central portion, in the direction of resiliency.

Valve 10 consists of two elements of rectangular shape and screw-threaded 21, 22 of same diameter each soldered to a tubular elbow 23. The element 21 comprises the valve proper and its cover 24 while the element 22 is directly attached to the air chamber by the nut 25 having the form of a collar at one extremity.

This nut 25 and the part 22 of the valve are lodged in a recess or space 11 provided in the beads 2ª, 2ᶜ. Valve 10 is held on the rim 4 by a nut 26 which tightens the latter by the intermediary of a rubber washer 27.

The rim 4 is assembled with the hub by the spokes 6, in two parts; the ends 28, 29 are screw threads, one with right hand thread and the other with left hand thread and a nut 30 enables the spokes to be adjusted.

Once properly adjusted the nut or union 30 is rendered fast by lock nuts 31, 32. This particular arrangement avoids the necessity of forming threaded housings on the rim 4 for the adjustment of each spoke as is usual by the use of a threaded nipple.

The external spokes of the wheel are fixed to ears 33 formed in one with the rim 4 which lightens the latter.

The rim 3 fitted with hooks 7, 7ª carries a tread surface or band 34 of pure rubber or similar material which is smooth and homogeneous in the case of the front wheel but is made of the non-skidding pattern for the rear wheels by portions of suitable material standing up in relief and curved inwardly 35 of slightly harder rubber alternating with strips 36 which are shorter and of softer rubber or caoutchouc. These blades and strips rest on a portion 37 which is fixed to the rim and made of hard caoutchouc. The curved profile of the blades 35 which stand up in relief, their narrowness and their alternate disposition facilitate their transversal or vertical deformation. The upstanding surfaces keep cool as a result of the deep grooves formed by the band and counteract the heating thereof during the running.

Hard bands 38 which are thicker or stouter protect the tread laterally against side shocks.

The whole, first hydraulically pressed together and combined with an amalgam flux is subsequently vulcanized to form a homogenous block.

After complete lamination of the parts initially fitted together, the arrangement will conserve always anti-skidding effect, the wear of the supple portions being more rapid than the hard parts, in all cases it will be possible to completely wear down the treads as smooth for the front wheels.

The lateral cheeks 13, 20 form around the shock absorber a portion limited on each side of the rim by a flexible undulated crown 39 of steel soldered to the rim and engaging with the corresponding cheek in an appropriate groove 40 at the bottom of which it is held by a leather cable or strap 41 fitted at one end with an eye and at the other end with a hook engaging in the former, a spring being placed between both these parts to keep the hook in engagement.

To ornament the wheel, the latter carries on the outside, a mask 42 formed by a complete metal disc having a circular opening 43 for the passage of the part 21 of the valve.

This mask is held secure by two wing nuts 44 tightened up against a leather or rubber washer 45.

To facilitate the mounting and dismounting of the crowns 1, 1ª there are provided emergency keys (see Fig. 5) constituted by parts 47, 48 which are screw threaded one with a left hand thread and the other with a right hand thread; these two parts are assembled by a nut 49. Part 47 rests at its head-piece 50 against a stop 51 provided on the rim 3 while the part 48 rests against the extremity of the cheek 20.

The mounting of the wheel is effected in the following manner;

The emergency keys 46 are first placed as in Fig. 5, the beads 2 and $2^a$ of the internal crown 1 being then inserted by hand in the curved portions 7 of the rim 3 and curved part 8 of the rim 4, then the bead $2^b$ of the external crown is introduced into the edge $7^a$ of the rim 3, the beads are marked to correspond with a mark on the rim so that the opening provided in the beads for the passage of the valve corresponds to the opening in the other crown. The beads 2, $2^b$ and parts 12 are placed in position taking care to turn down the leather bands on part 12 which are provided for this purpose; next the air chamber, slightly inflated, is placed in position and then the last bead $2^c$ against its corresponding bead. At this stage there is only left to place cheek 13 in position and to tighten the nut 18 so that the two edges of the cheek are drawn together and the base of the same slides on the part 19 thereby tightening bead $2^c$ against the corresponding bead $2^a$ to securely hold the pneumatic shock absorber or buffer.

The complete mounting of the crowns is effected without employing any lever capable of damaging the chambers which on the other hand stand no risk of being nipped beneath the beads.

The air chamber is then inflated to a higher degree than normally used so as to press tightly between the beads 2, $2^b$, the block pieces 12; after this the pressure is brought down again to normal, the beads being then secured firmly in place. Should the tire burst or become deflated it is possible to continue the journey at a comparatively reduced speed by employing emergency keys which enable the rims and cheeks to be held at the necessary distance apart and thereby also the hub itself, the carrying along of the parts being ensured by the crowns 1, $1^a$ so that a solid rim wheel is obtained having sufficient elasticity for the time being.

Having now particularly described and escertained the nature of my said invention, and in what manner the same is to be performed, I declare that what I claim is:—

1. In a wheel, a rim, an auxiliary rim secured to the hub a pair of substantially semi-tubular flexible crown members between and secured to said rim and auxiliary rim, and having their outer peripheral portions spaced apart, an inflatable inner tube between said crown members, and a block member in the space between the outer peripheral portions of the crown members and pressed and held in place by the inner tube when the latter is inflated.

2. In a wheel, a rim having clincher flanges on its inner periphery, an auxiliary rim secured to the hub, a pair of substantially semi-tubular flexible crown members between said rims and having their outer peripheral portions spaced apart and provided with beads engaging the said clincher flanges, an inflatable inner tube between said crown members, and a block member in the space between the outer peripheral portions of the crown members and pressed and held in place by the inner tube when the latter is inflated.

3. In a wheel, a rim, an auxiliary rim secured to the hub, a pair of substantially semitubular flexible crown members between and detachably secured to said rims, cheek members on the outer sides of the crown members, one secured to the auxiliary rim independently of the corresponding crown member and the other having separable ends and being detachably engaged both with the auxiliary rim and the hub of the corresponding crown member, and means to secure the outer peripheral portions of said cheek members.

4. A resilient wheel with pneumatic buffer characterized by; emergency locks which facilitate the mounting and dismounting of the crowns and further in case of accident to the pneumatic buffer, enable the journey to be completed at relatively reduced speed by running on the used solid tread; the locks comprising two stems fitted with appropriate beads arranged on the cheeks and beneath the external rim and provided with right and left hand screw threads assembled together by a nut with similar screw threads.

In testimony whereof I have hereunto affixed my signature in presence of a witness this 17th day of July, 1919.

ALBERT ALEXANDRE AUGUSTIN DARCHE.

Witness:
CHAS. P. PRESSLY.